Sept. 22, 1970            F. J. GRIST            3,530,359
ADJUSTABLE ARC WELDING POWER SUPPLY SYSTEM
Filed Sept. 20, 1968            2 Sheets-Sheet 1
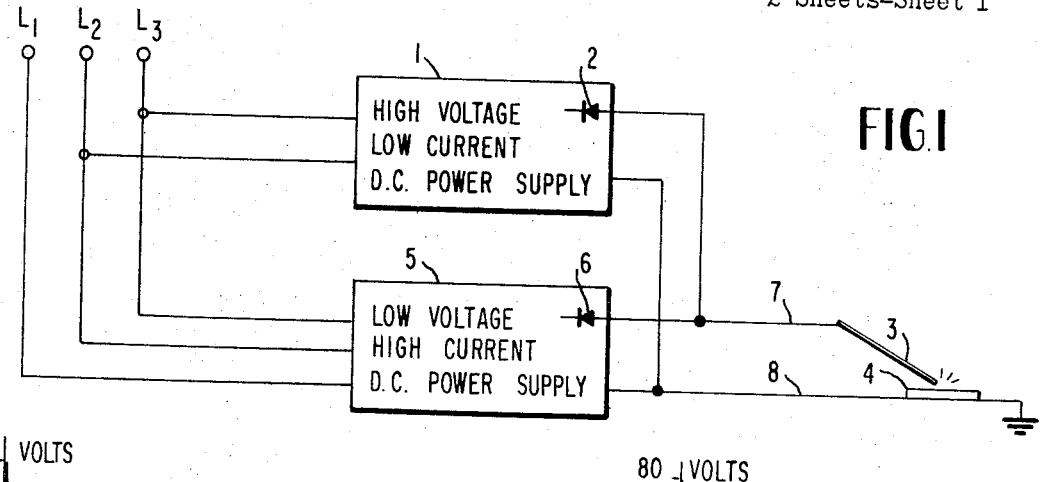
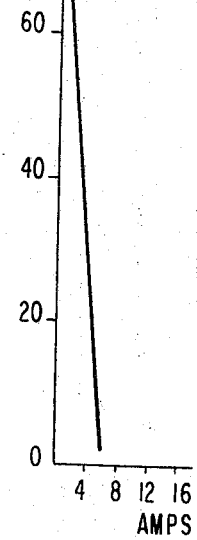
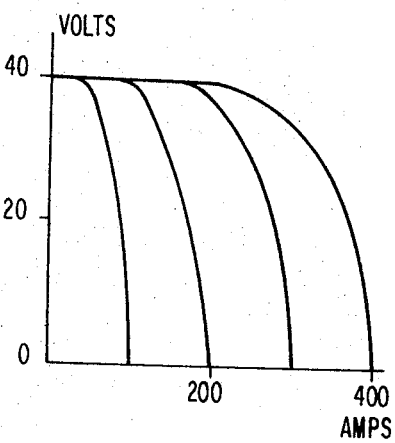
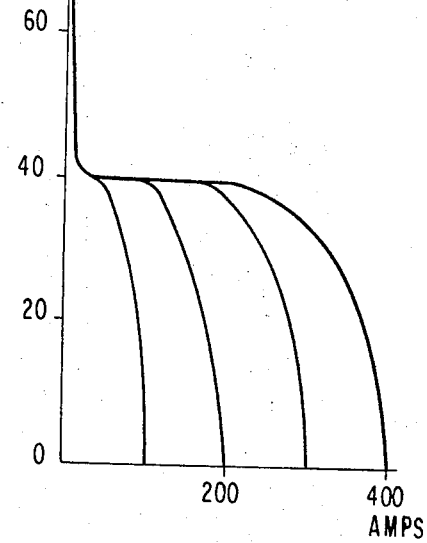
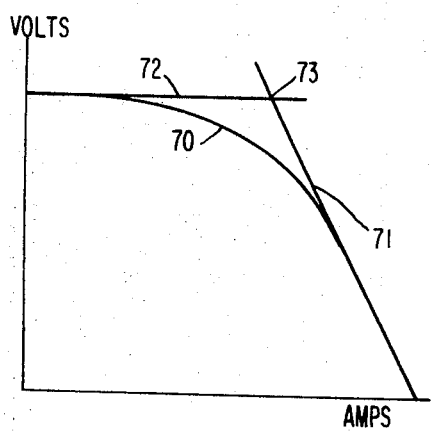
INVENTOR
FRANKLIN JAMES GRIST
BY Sughrue, Rothwell, Mion,
Zinn & Macpeak
ATTORNEYS Sept. 22, 1970        F. J. GRIST        3,530,359

ADJUSTABLE ARC WELDING POWER SUPPLY SYSTEM

Filed Sept. 20, 1968        2 Sheets-Sheet 2

United States Patent Office 3,530,359
Patented Sept. 22, 1970

3,530,359
ADJUSTABLE ARC WELDING POWER SUPPLY SYSTEM
Franklin James Grist, Appleton, Wis., assignor to Miller Electric Manufacturing Co., Appleton, Wis.
Filed Sept. 20, 1968, Ser. No. 761,061
Int. Cl. B23k 9/10; H02m 7/00
U.S. Cl. 321—5                                                 5 Claims An adjustable arc welding power supply system includes a first power supply of the rectifier type connected in parallel with a second power supply of the rectifier type. The first power supply provides low current at high voltage to the electrodes while the second power supply provides high current at low voltage to the electrodes and has rectifiers preventing the output of the first high-voltage power supply from discharging into the second lower voltage supply. The slope of the volt-ampere curve of the second low-voltage high-current power supply is made adjustable by an electronic feedback circuit.

BACKGROUND OF THE INVENTION

Field of the invention

This invention relates to improvements in power supplies for arc welding and particularly, to dual power supplies of the rectifier type connected in parallel, one of which provides low current at high voltage and the other, high current at low voltage with volt-ampere curve shaping.

DESCRIPTION OF THE PRIOR ART

Prior art arc welding machines have been built to deliver a given maximum current, for example, 400 amps, and to have a high open circuit voltage, for example, 80 volts. Although a lower voltage, for example, 32 volts, is sufficient to maintain the arc when started, the high open circuit voltage is needed to break through various oxides, electrode coatings, etc., to start the arc reliably, and to provide the proper shape to the volt-ampere curve. The need for both the high starting voltage and maximum current requires large expensive welding transformers with heavy wire and a large number of turns. In this prior art example, the transformer secondary must be capable of producing both 400 amps when loaded and 80 volts when open-circuited.

A definite volt-ampere slope is both necessary and desirable. Most consumable electrodes will operate properly with a 40 volt or lower arc. Therefore, a machine with a 40 volt open-circuit voltage would be sufficient if the proper slope of the volt-ampere curve could be provided and if the arc could be reliably started.

It is known in the art to provide a welding machine with a main power supply and a small auxiliary drive circuit in parallel therewith to provide an approximately 12 volt supply which floats on the line unused until the electrode arc voltage falls to 12 volts or less.

In the past, curve shaping of the volt-ampere curve has been accomplished by providing in the welder a "drooping" component, such as a high-leakage transformer, an AC reactor, resistor, etc. However, if it were attempted to generate from a 40 volt open-circuit supply a volt-ampere curve having a usable slope, the proper operating points could not be reached.

SUMMARY OF THE INVENTION

This invention provides an arc welder power supply system energized from a source of alternating potential and including two power supplies of the rectifier type which are connected in parallel between the alternating potential source and the welding electrodes. One power supply provides low current at high voltage for starting the arc, and the other power supply provides high current at low voltage with a shaped volt-ampere curve. Rectifiers in the second power supply prevent the output from the first power supply from discharging into the second power supply. A control, in the nature of a closed feedback loop, is used in the second power supply to control the slope of the volt-ampere curve electronically. The low-voltage high-current power supply includes a three-phase transformer of the constant potential component type having no "droop" components, such as reactors. The transformer output is gated by means of SCR's and a signal of a magnitude in direct proportion to the load current is fed back through a central electronic control. This invention permits the volt-ampere rating of the supply transformer to be greatly reduced.

BRIEF DESCRIPTION OF THE DRAWING

FIG. 1 is a circuit block diagram of the overall power-supply system.

FIG. 2A, 2B and 2C are typical curves illustrating volt-ampere load characteristics of the power-supply system.

FIG. 4 is a volt-ampere curve illustrating the operation of the slope-control circuit of FIG. 3.

DESCRIPTION OF THE PREFERRED EMBODIMENT

Figure 3:
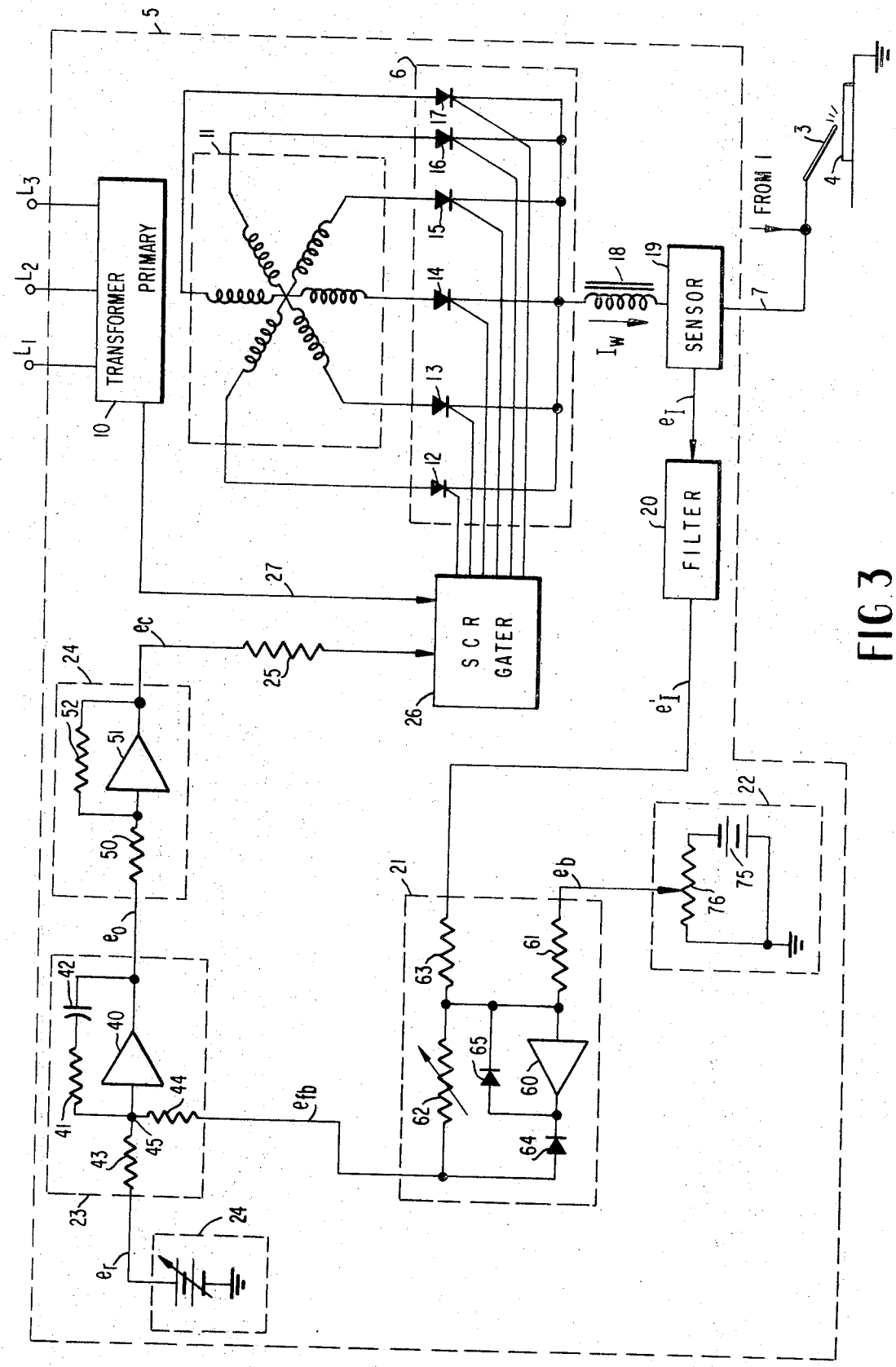
FIG. 3 is a schematic circuit diagram illustrating in detail the low-voltage high-current power supply and the volt-ampere slope-control circuit which are parts of the power supply system.

FIG. 1 illustrates, in schematic block-diagram form, the power-supply system of this invention. There is provided a source of three-phase alternating potential, such as three input power lines $L_1$, $L_2$ and $L_3$. A first power supply 1 of the rectifier type, including a rectifier 2 shown schematically, is connected across lines $L_2$ and $L_3$. This power supply is constructed to provide low current at high voltage to welding electrodes 3 and 4 for starting the arc. The power supply 1 may be, for example, a one-phase 4-amp supply of a typical no-load voltage of 80 volts. However, it is within the scope of the invention to operate power supply 1 from three-phase current. The output of power supply 1 by itself would be similar to that shown in the volt-ampere curve of FIG. 2A.

A second power supply 5 is connected to the source of alternating potential and across the welding electrodes 3 and 4 in parallel with the high-voltage low-current power supply 1. Power supply 5 is of the low-voltage high-current type and is shown operating from three input power phases. Supply 5 has a typical no-load output voltage of 40 volts and a maximum load current of 400 amps. The maximum load current may be changed by internal settings of the power supply. A rectifier 6 at the output of power supply 5 includes suitable rectifying elements, such as diodes, having a peak inverse voltage rating sufficiently high to block the higher voltage which appears at the paralleling point from power supply 1. In other words, these rectifying elements prevent the 80 volts of power supply 1 from feeding current into power supply 5 which produces only 40 volts. Although rectifiers 2 and 6 are illustrated as single rectifier elements for ease of illustration, they may be constructed of multiple elements. Power supply 5 has a volt-ampere curve slope controller shown in more detail in FIG. 3.

FIG. 2B illustrates a family of typical volt-ampere curves produced by power supply 5 operating alone.

FIG. 2C illustrates a family of typical volt-ampere curves of the welding arc when the two power supplies 1 and 5 are operating together in parallel. A high voltage is available at low currents from power supply 1, for starting the arc, but for high currents after the arc is struck, the low-voltage power supply 5 takes over and provides a volt-ampere curve having a varying slope. The power supply outputs are connected across lines 7 and 8 to welding electrodes 3 and 4, which may be a welding rod and workpiece, respectively.

FIG. 3 shows in more detail the low-voltage high-current power supply 5 with volt-ampere curve slope controlling means. Three-phase line voltage from lines $L_1$, $L_2$ and $L_3$ is supplied to a transformer primary winding 10. A secondary winding 11 of the transformer supplies current through a block 6 of controllable rectifiers, such as silicon-controlled rectifiers (SCR's) 12 through 17 to a smoothing choke 18. The SCR's have a peak inverse voltage which is high enough to prevent the 80 volt supply 1 from discharging power into the 40 volt supply 5. Block 6 of SCR's corresponds to the rectifier 6 of FIG. 1.

Current $I_w$ from the smoothing choke passes through a current sensor 19 and through line 7 to the arc electrode 3. Current sensor 19 supplies a signal $e_I$ to a ripple filter 20, to generate a filtered signal $e_I'$ which is used to control the slope of the v.-a. curve of the arc by feedback. Signal $e_I$ is proportional to the current $I_w$ through choke 18 and sensor 19. Signal $e_I'$ is proportional to the current through sensor 19 but without the ripple component of that current.

Signal $e_I'$ is supplied to one input of slope controller 21, where it is compared with a bias signal $e_b$ from bias signal generator 22. Based upon the results of this comparison and the internal settings of controller 21, the controller generates an output signal $e_{fb}$ which is a negative feedback signal used to control the slope of the v.-a. curves.

The feedback signal $e_{fb}$ is applied to one input of an augmenting integrator 23. A positive reference signal $e_r$ derived from reference signal generator 24, is applied to the other input of augmenting integrator 23.

Augmenting integrator 23 is controlled by the algebraic sum of the positive reference signal and the negative feedback signal to generate an output signal $e_o$ having two components—one proportional to this algebraic sum and one proportional to the integral of this algebraic sum. Of course, these two components are inherently combined to form the output signal $e_o$ equal to the sum of the two components.

The output signal $e_o$ is applied to an inverting preamplifier to generate a control signal $e_c$ having a magnitude proportional to the output signal $e_o$ and having opposite polarity. This control signal $e_c$ also has a proportional component and an integral component, causing its use to result in proportional plus reset (i.e. integral) control. The proportional component causes an error correction effect proportional to instantaneous error and the integral effect will cause another error correction effect proportional to the cumulative or time integral value of error. Proportional plus reset control in any such control system results in fast correction of errors.

The control signal $e_c$ is applied through resistor 25 to the control terminal of a conventional SCR gater 26. A phase gating signal on line 27 is also applied to gater 26 for timing purposes. The output signals from gater 26 are applied to the control terminals of SCR's 12–17 to control the flow of current from the transformer secondary 11 to the arc.

A more detailed description of the elements of the circuit of FIG. 3 follows. Referring now to augmenting integrator 23, this integrator contains an operational amplifier 40 having a feedback path, including a resistor 41 and a capacitor 42, and two input resistors 43 and 44. The feedback path and the two input resistors are electrically connected, at a junction point 45, to the input terminal of amplifier 40. Such an augmenting integrator operates, in a manner well-known in the analog computer art, to generate an output signal having one component proportional to the algebraic sum of the input signals as weighted by the input resistors and having another component proportional to the time integral of that algebraic sum.

In the case of augmenting integrator in this circuit the input signals are $e_r$ and $e_{fb}$, so $e_o$ may be represented as follows:

$$e_o = K_1(k_1 e_{fb} + k_2 e_r) + K_2 \int (k_1 e_{fb} + k_2 e_r) dt$$

where $k_1$, $k_2$, $K_1$ and $K_2$ are set by the values of resistance and capacitance in the augmenting integrator circuit in a manner well-known in the analog computer art.

Reference signal $e_r$ may be supplied by any adjustable D.C. voltage source to input resistor 43. Reference signal $e_r$ controls the general level of arc current, subject to control by feedback. The feedback signal $e_{fb}$, generated in a manner more completely described below, is applied to input resistor 44.

The output signal $e_o$ from amplifier 40 is applied to input resistors 50 of inverting pre-amplifier 24. Pre-amplifier 24 comprises an operational amplifier 51 having an input resistor 50 and a feedback resistor 52. The output of amplifier 51 is a control signal $e_c$ which is applied through a resistor 25 to the well-known, commercially available SCR gater 26, which accepts a small DC current at its input and produces a train of pulses at its output to fire SCR's 12–17 in proper sequence. The phase gating signal on line 27 from transformer primary 10 synchronizes gater 26 with the voltages appearing at the anodes of the SCR's.

In the present embodiment, gater 26 provides six pulses, one for each SCR, at the proper time, continuously. Because the SCR's are connected to a three-phase transformer secondary 11, the SCR's are commutated to conduct during positive half cycles in the same sequence as the sequence of positive half wave outputs of the transformer secondary terminals. No SCR will conduct unless a pulse from the gater is applied to that SCR at a time when the transformer secondary terminal corresponding to that SCR is producing a positive half cycle of the terminal output voltage waveform.

By shifting the gate pulses from gater 26 forward or backward in relation to the terminal voltage waveform, the firing angles of the SCR's are respectively advanced or retarded and the SCR's will fire at different times corresponding to different terminal voltages. Thus, the voltage output from the SCR's can be controlled in magnitude. The gater controls the firing angle of the gating pulses in response to the magnitude of the gater input signal $e_c$. The total current $I_w$ supplied to the welding arc from current supply 5 is thus a function of the control voltage at the input of gater 26 and is polarity-rectified from the AC supplied by transformer secondary 11.

It was stated earlier that signal $e_r$ from adjustable voltage source 24 controls the general level of arc current, subject to control by feedback. This feedback is provided by the slope controller 21, illustrated as consisting of an amplifier 60 and elements 61–68. The slope controller is set to control which one of the family of curves, as illustrated in FIG. 2B, or of an infinite number of other possible (unillustrated) curves, will be generated as the output of current supply 2.

FIG. 4 illustrates one of the possible curves from the family of curves of FIG. 2B. Lines 71 and 72 are approximately asymptotes of v.-a. curve 70, intercepting each other at intercept point 73. Curve 70, in practice, is much closer to the asymptotes than is shown in FIG. 4 for purposes of illustration only. Line 72 is nearly level, with a slight slope downward toward point 73. Line 71 has a slope which may be varied by the slope controller.

Bias signal generator 22, containing voltage source 75, and potentiometer 76 bias the input of amplifier 60 through input resistor 61 to some negative value to set the intercept point 73. Variable resistor 62, together with input resistor 63, adjusts the gain of the slope-controller amplifier system 21 along asymptote 71, thus controlling the slope of asymptote 71. Diodes 64 and 65 are connected and poled to prevent the amplifier from providing a system feedback signal through resistor 44 to amplifier 40 until the signal $e_I'$ from filter 20 through resistor 21 reaches some sufficiently positive value to overcome the negative bias set by elements 75, 76 and 61. Thus, the v.-a. curve 70 remains nearly level along asymptote 72 until it reaches the intercept point 73 set by the slope controller.

The negative feedback signal $e_{fb}$ from the slope controller 21 is applied through resistor 44 to the input terminal 45 to contribute to the proportional plus integral output signal $e_o$ from augmenting integrator 23. The output $e_o$ of the augmenting integrator 23 is fed through the inverting amplifier 24 to produce the control signal $e_c$ which is applied via resistor 25 to SCR gater 26 which controls the firing angle of SCR's 12–17 to control the current supplied to the arc. Feedback signal $e_{fb}$ is zero below the point of intercept, resulting in a maximum signal at the input 45 of amplifier 40 and maximum voltage on the v.-a. curve of the power supplied to the arc, i.e. full output is obtained from supply 5 up to the point of intercept. There is some slight variation in the voltage of the v.-a. curve below the point of intercept because of the variation in loading of the transformer coils 10 and 11, but this is a rather minor variation.

When the point of intercept is reached, amplifier 60 begins supplying a negative feedback signal $e_{fb}$ to amplifier 40 through resistor 44, thus reducing the net positive signal at the input terminal 45. This reduced positive input signal results in a smaller voltage supplied to SCR gater 26 and thus, a smaller voltage is applied from the SCR's to the arc. Because the amount of feedback signal $e_{fb}$ is a function of the current through current sensor 19, the arc current is set by the voltage from voltage source 24, while the point of intercept and slope of the v.-a. curve is set by the slope controller 21.

Thus, the system can function as a constant current welder. The arc voltage at electrode 3 is a function of the arc plasma composition (as determined by the electrode, parent material and covering gas), the work-to-electrode distance (arc length) and the current density.

However, parameters other than the magnitude of the welding current may be used to provide the feedback control. If the current sensor 19 is replaced with a voltage sensor energized by the arc voltage at electrode 3, a constant potential welder system is produced.

Furthermore, a power sensor (whose output signal is a function of the product of the welding current and the arc voltage) can be utilized to provide a constant power welding system.

The inverter amplifier 24 can be omitted if a more sensitive negative-driven SCR gater is used. The ripple filter 20 may not be required in cases where the supply output is reasonably smooth.

The augmenting integrator described here can be replaced by servo-controlled potentiometers known in the prior art but their considerable extra expense and loss of speed of response makes such replacement undesirable.

The advantages include better and easier control of the volt-ampere slopes which can be generated by two simple potentiometers. In addition, the system is less expensive since it eliminates both the conventional saturable reactors and conventional rectifier assemblies, and the transformers can be rated considerably lower than conventional transformers. In the preferred embodiment described above, the volt-ampere rating of the transformer need be nominally only 40×400=16,000 v.-a. rather than the 32,000 v.-a. required in the prior art. In addition, the arrangement can be made fast and responsive to a control signal because of the elimination of a large number of magnetic components which often have a considerable time lag and stored energy to dissipate in response.

Many more examples of the application of the present invention will suggest themselves to those skilled in the art. Alternative methods of accomplishing the invention may suggest themselves to those skilled in the art.

I claim:
1. A system for supplying electrical energy to the electrodes of an arc welding device from a source of alternating polarity electricity comprising:
   (a) first supply means responsive to a control signal and adapted to be connected to a source of alternating polarity electricity for supplying polarity rectified electricity, the amplitude of at least one parameter of said polarity rectified electricity being controlled by said control signal,
   (b) means for applying said polarity rectified electricity to said electrodes,
   (c) means responsive to said polarity rectified electricity for generating a first electrical signal having an amplitude substantially proportional to the average value of said amplitude of said parameter,
   (d) means for comparing said first electrical signal with an adjustable bias signal to generate a feedback signal which is proportional to the difference between said first and said bias signals if said difference is of one of two polarities and which feedback signal is zero if said difference is of the other of said two polarities, and
   (e) means for comparing said feedback signal with an adjustable reference signal to generate said control signal having one component proportional to difference between said feedback and said reference signals, and having another component proportional to the time integral of said difference between said feedback and said reference signals.

2. A system according to claim 1 wherein said means for supplying polarity rectified electricity comprises:
   (a) a plurality of gated rectifier devices responsive to a corresponding plurality of gating signals and adapted to be connected to said source of alternating polarity electricity for producing said polarity rectified electricity, and
   (b) means responsive to said control signal for generating said plurality of gating signals as pulses in a predetermined order, the phase angle between each of said gating signals and said alternating polarity electricity being controlled as a function of said control signal.

3. A system according to claim 1 wherein said first comparing means for generating said feedback signal comprises a slope controller circuit which determines the slope of the volt-ampere curve of the system, said slope controller circuit comprising:
   (a) a feedback operational summing amplifier receiving as inputs said first electrical signal and said adjustable bias signal, and
   (b) rectifying means connected to the input and the output of said operational summing amplifier for preventing said amplifier from providing a feedback signal unless said first electrical signal is sufficiently larger than said adjustable bias signal.

4. A system according to claim 3 wherein said second comparing means for generating said control signal comprises an augmenting integrator connected to receive as inputs said feedback signal and said adjustable reference signal, the arc current of said arc welding device being determined by the magnitude of said adjustable reference signal.

5. A system according to claim 1 further comprising:
   (a) second supply means for supplying additional polarity rectified electricity having a maximum voltage higher than, and a maximum current lower than, the voltage and current, respectively, supplied by said supply means, and (b) means connecting said second supply means in parallel with said first supply means and to said electrodes.

References Cited

UNITED STATES PATENTS

| | | | |
|---|---|---|---|
| 2,707,267 | 4/1955 | Gavin | 307—75 XR |
| 3,346,799 | 10/1967 | Aldenhoff | 321—27 XR |
| 3,356,928 | 12/1967 | Parrish | 321—18 |
| 3,371,242 | 2/1968 | Aldenhoff | 219—135 XR |

FOREIGN PATENTS

| | | |
|---|---|---|
| 567,822 | 12/1958 | Canada. |
| 784,787 | 10/1957 | Great Britain. |
| 1,420,560 | 11/1965 | France. |

W. M. SHOOP, Jr., Primary Examiner

U.S. Cl. X.R

219—135; 307—69, 75; 321—18